UNITED STATES PATENT OFFICE.

HARVEY A. SEIL, OF PITTSBURGH, PENNSYLVANIA, ASSIGNOR TO STANDARD CHEMICAL COMPANY, OF PITTSBURGH, PENNSYLVANIA.

PROCESS FOR THE MANUFACTURE OF URANIUM OXID.

1,210,714. Specification of Letters Patent. Patented Jan. 2, 1917.

No Drawing. Application filed April 20, 1916. Serial No. 92,543.

*To all whom it may concern:*

Be it known that I, HARVEY A. SEIL, a citizen of the United States, and a resident of Pittsburgh, in the county of Allegheny and State of Pennsylvania, have invented certain new and useful Improvements in Processes for the Manufacture of Uranium Oxid; and I do hereby declare the following to be a full, clear, and exact description of the invention, such as will enable others skilled in the art to which it appertains to make and use the same.

This invention relates to an improved process for the manufacture of oxids of uranium,—one object of the invention being to provide a simple, cheap and efficient process whereby uranium oxid, substantially free from alkali metals (such as sodium or potassium) may be made from alkali uranates, such as sodium uranate or potassium uranate.

With this and other objects in view, the invention consists in certain novel steps in the manufacture of uranium oxid, as hereinafter set forth and pointed out in the claims.

In carrying my improved process into effect, I moisten finely divided alkali uranate (such as sodium uranate, $Na_2U_2O_7$) with dilute sulfuric acid (preferably from 30 to 50 per cent. dilution), using a sufficient quantity of the acid to combine with the alkali (sodium) present to form sodium sulfate or bi-sulfate. This product will now essentially comprise sodium sulfate or bisulfate plus uranium oxid, $U_3O_8$. I next introduce this product into a crucible and heat the same to a bright red, approximately from 1000 to 1200 degrees C. During the first part of this second or heating step of the process, the sodium uranate, which had not been acted upon during the first or acid-treating step, will be converted into sodium sulfate, uranium oxid and also a slight amount of uranium sulfate. As the temperature increases, the excess of acid will be driven off, and sodium bi-sulfate will be converted into sodium sulfate and the uranium sulfate will be converted into uranium oxid,—thus giving a product of sodium sulfate and uranium oxid.

After the product of sodium sulfate and uranium oxid has cooled, I crush the same, and then leach it with hot water to dissolve the sodium sulfate and then, after filtering and washing, I recover uranium oxid, substantially free from alkali metals (such as sodium or potassium) as the final product of the process.

Having fully described my invention what I claim as new and desire to secure by Letters-Patent, is:—

1. The herein described process of manufacturing uranium oxid, consisting in moistening an alkali uranate with dilute sulfuric acid, subjecting the resultant product to heat sufficient to drive off excess acid and then render a product comprising an alkali sulfate and uranium oxid and finally treating this product to separate the alkali sulfate therefrom and recover as a final product, uranium oxid substantially free from alkali metals.

2. The herein described process of manufacturing uranium oxid from alkali uranates, consisting in moistening finely divided alkali uranate with dilute sulfuric acid, subjecting the resultant product to heat sufficient to drive off excess acid and render a product comprising an alkali sulfate and uranium oxid, allowing this product to cool, then crushing the same, then leaching with hot water to separate said sulfate, then successively filtering and washing, and finally recovering, as a final product, uranium oxid substantially free from alkali metals.

In testimony whereof I have signed this specification in the presence of two subscribing witnesses.

HARVEY A. SEIL.

Witnesses:
F. H. ALLISON,
JAMES B. DONNELLY.